(No Model.)

C. N. PERKINS.
THREE HORSE HITCH.

No. 539,824. Patented May 28, 1895.

Witnesses
F. L. Ourand
C. N. Hood

Inventor
Chas. N. Perkins
By Wm. R. Singleton
Attorney

UNITED STATES PATENT OFFICE.

CHARLES N. PERKINS, OF LAWRENCE, MASSACHUSETTS.

THREE-HORSE HITCH.

SPECIFICATION forming part of Letters Patent No. 539,824, dated May 28, 1895.

Application filed October 4, 1894. Serial No. 524,922. (No model.)

*To all whom it may concern:*

Be it known that I, CHARLES N. PERKINS, a citizen of the United States, residing at Lawrence, in the county of Essex and State of Massachusetts, have invented certain new and useful Improvements in Three-Horse Hitches for Detachable Draft-Frames; and I do hereby declare the following to be a full, clear, and exact description of the invention, such as will enable others skilled in the art to which it appertains to make and use the same.

This invention relates to certain improvements in detachable draft frames, designed for use particularly in connection with portable fire-engines and trucks, &c., which will be hereinafter more particularly described and pointed out.

Figure 1:
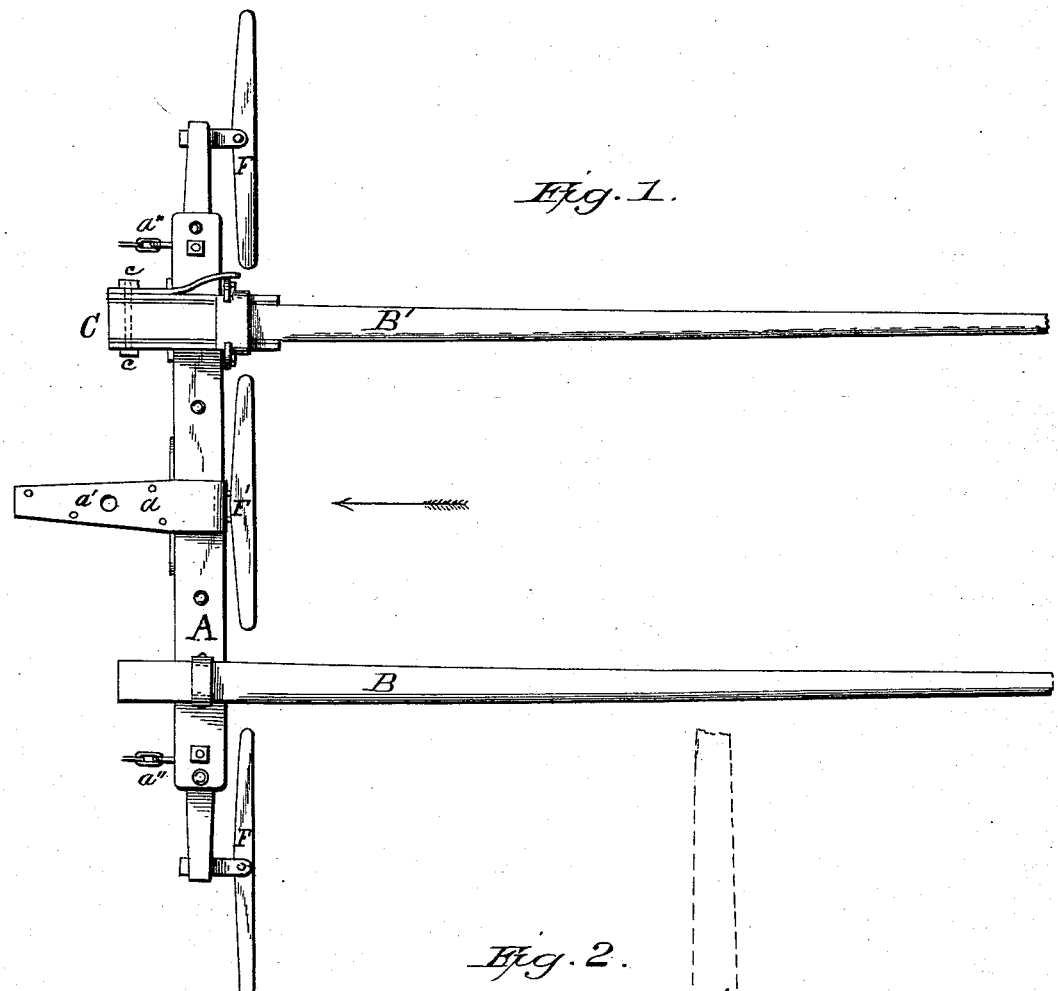
Figure 2:
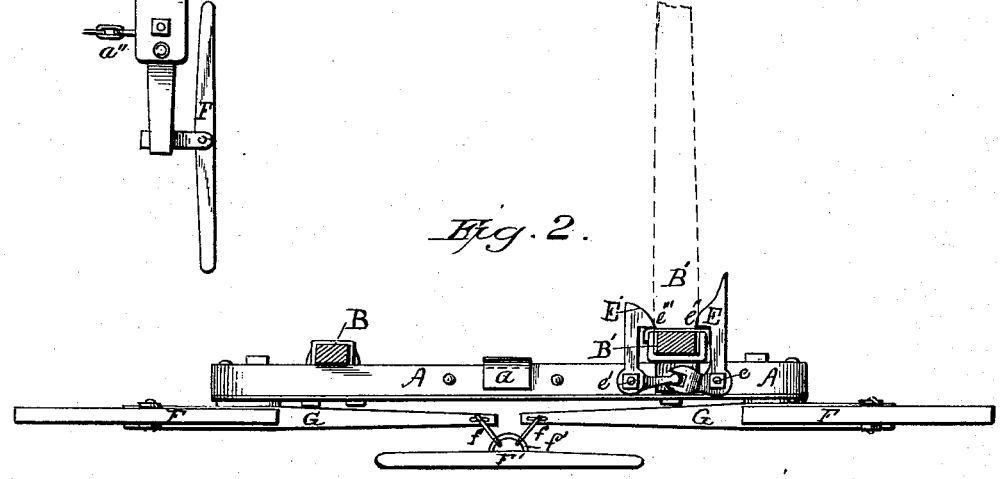
Figure 3:
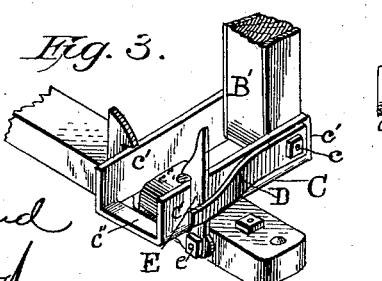
Figure 4:
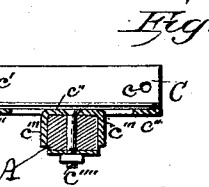

In the accompanying drawings, forming part of this specification, Figure 1 is a plan view of the detachable frame. Fig. 2 is a vertical view of Fig. 1 in direction of the arrow. Figs. 3 and 4 are details which will be described hereinafter.

A is a substantial bar, having secured to its rear a tongue $a$, having in it a vertical hole $a'$ for a bolt, by which the frame is to be attached to the engine, &c. Not shown in the drawings.

B is a pole, shown permanently attached to the bar A, in any substantial manner. B' is also a pole, which is attached to a wrought steel box or flanged plate C, by a bolt $c$ which is also a pivot. The box or plate C is struck up of one piece of wrought steel, as shown in detail in Figs. 3 and 4. The two sides $c'$ are turned up to form an open trough. The bottom $c''$ has two rectangular pieces $c'''$ cut on three sides and turned downwardly to form a clamp over the top of the bar A, to which the whole box or plate C is secured by a bolt $c''''$ as shown in Fig. 4.

On one side of the box C is a flat spring D which bears against a bell crank hooked lever E which is pivoted to the side of the bar A. The upper end of lever E has a projecting catch $e''$, and at the end a notch.

There is on the opposite side of the box a corresponding bell crank lever E' which is also pivoted to the bar A, by the bolt $e'$. The upper end of lever E' has a catch $e'''$, and its other end has a rounded knob to fit into the notch of the lever E, so that the movement of either lever correspondingly affects the movement of the other. When in position, as shown in the drawings and the pole B' is down in place, the catches of E and E' will keep it securely in its place. Whenever the pole B' is to be lifted, either to put in the animal or to remove him, it is in the vertical position shown by the stump in Fig. 3, and broken lines in Fig. 2.

The whiffletrees F are shown in the drawings as usually attached to the two doubletrees G, which have their pivot bolts arranged so that the leverage of the inner arms will compensate for the middle animal attached to F' to equalize the draft of the two outside animals, by its connecting rings $f, f, f'$ with the long arms of the double tree, all of which have been long in use.

$a''$ are the chains in the rear of the bar A, shown broken by which the bar A is connected to the engine in addition to the tongue and bolt $a\ a'$.

I claim—

The box or plate C constructed substantially as described in combination with the bell crank levers supplied with catches E E' and connected by a toggle joint and controlled by a spring—and the pole B' all as and for the purpose described.

CHARLES N. PERKINS.

Witnesses:
CHARLES F. SARGENT,
FRED. J. BRADFORD.